(12) United States Patent
Morikawa et al.

(10) Patent No.: US 6,595,614 B2
(45) Date of Patent: Jul. 22, 2003

(54) INK-JET PRINTER

(75) Inventors: Yukio Morikawa, Minato (JP); Jun Moroo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/159,286

(22) Filed: Jun. 3, 2002

(65) Prior Publication Data

US 2002/0191045 A1 Dec. 19, 2002

Related U.S. Application Data

(63) Continuation of application No. PCT/JP99/06822, filed on Dec. 6, 1999.

(51) Int. Cl.[7] .................................................. B41J 2/25
(52) U.S. Cl. ............................ 347/15; 347/43; 347/41
(58) Field of Search ........................... 347/41, 15, 43, 347/40, 12

(56) References Cited

U.S. PATENT DOCUMENTS

| | | | |
|---|---|---|---|
| 4,198,642 A | 4/1980 | Gamblin | 346/75 |
| 5,844,582 A | 12/1998 | Shioya | 347/15 |
| 5,844,585 A | 12/1998 | Kurashima et al. | 347/43 |
| 5,874,970 A | 2/1999 | Saito et al. | 347/12 |
| 6,334,665 B1 | 1/2002 | Yoshida | 347/40 |
| 6,435,651 B1 * | 8/2002 | Otsuki et al. | 347/41 |
| 6,530,646 B2 * | 3/2003 | Otsuki | 347/41 |

FOREIGN PATENT DOCUMENTS

| | | |
|---|---|---|
| EP | 0842781 | 5/1998 |
| EP | 0927633 | 7/1999 |
| JP | 04-358859 | 12/1992 |
| JP | 04-361053 | 12/1992 |
| JP | 07-052465 | 2/1995 |
| JP | 09-011509 | 1/1997 |
| JP | 09-071009 | 3/1997 |
| JP | 10-181027 | 7/1998 |
| JP | 11-028827 | 2/1999 |
| JP | 11-034398 | 2/1999 |
| JP | 2000-025272 | 1/2000 |

* cited by examiner

*Primary Examiner*—Lamson Nguyen
(74) *Attorney, Agent, or Firm*—Armstrong, Westerman & Hattori, LLP

(57) ABSTRACT

An ink-jet printer using a small and a large line feeds has been disclosed. The ink-jet printer comprises a head on which B ink spraying nozzles are arranged at fixed nozzle intervals in the vertical scanning direction and a vertical scanning mechanism, wherein the nozzle interval is A times the dot pitch and the printing action is composed of a single printing scan in the main scanning direction, a small line feed printing that repeats an action (C×A−1) times, in which after a small line feed that relatively moves the recording medium in the vertical scanning direction by the amount of n times the nozzle interval plus one dot pitch ((A×n+1)×d) is performed, a single printing scan in the main scanning direction is performed, and a subsequent large line feed printing that performs a large line feed by the amount of (B×A−(A×n+1)(C×A−1))×d.

5 Claims, 19 Drawing Sheets

Fig.2
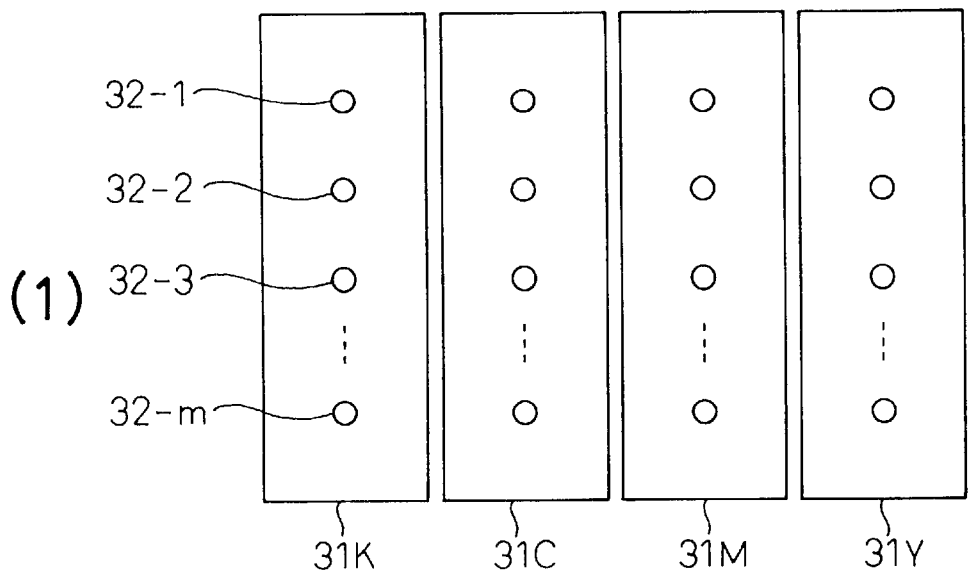
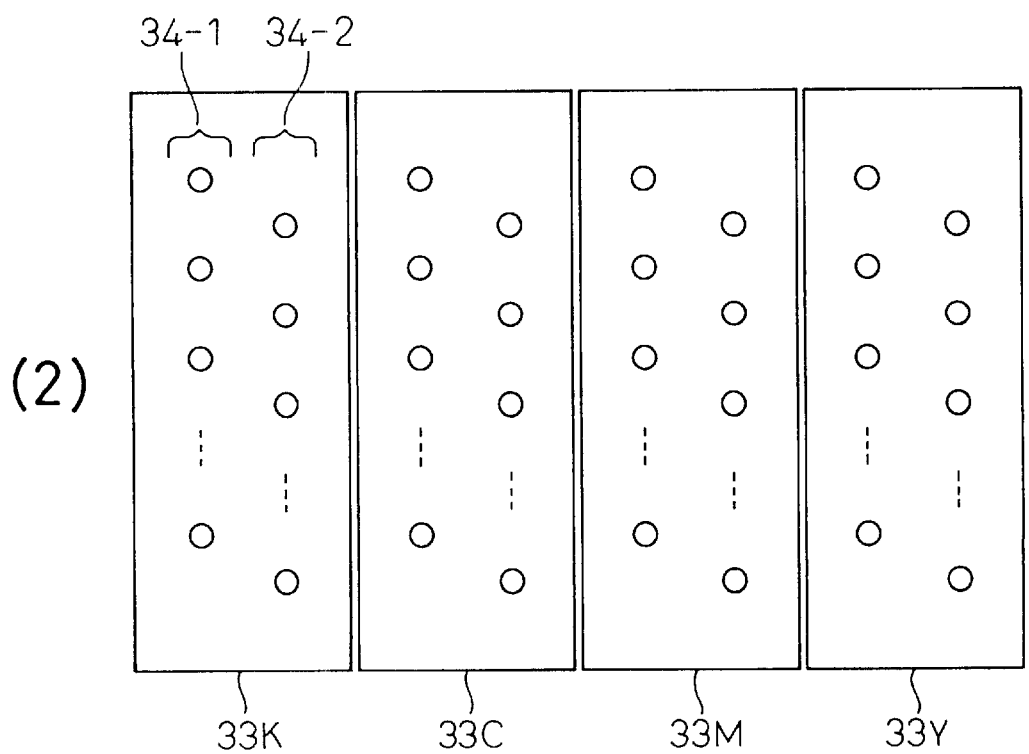

Fig.5
(1) 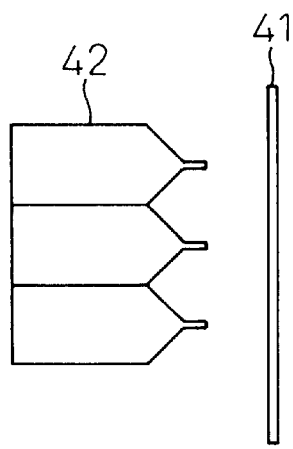
(2) 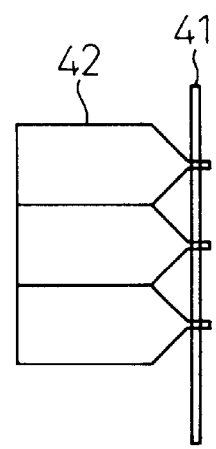
(3) 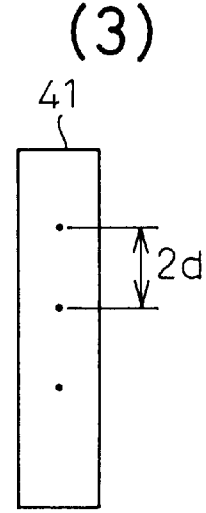
(4) 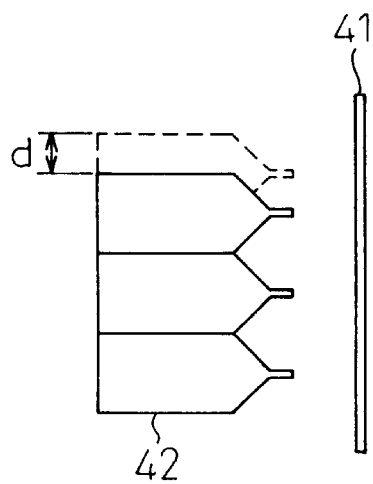
(5) 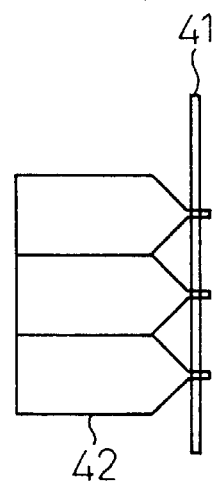
(6) 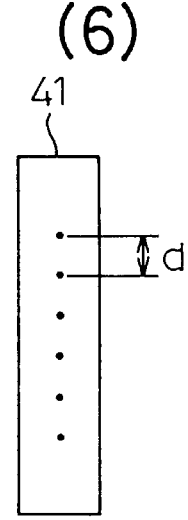

Fig.6
(1) 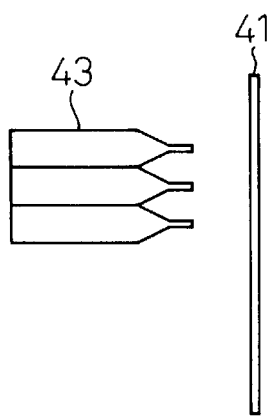 (2) 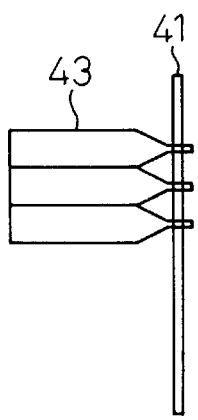 (3) 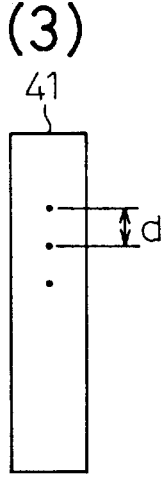
(4) 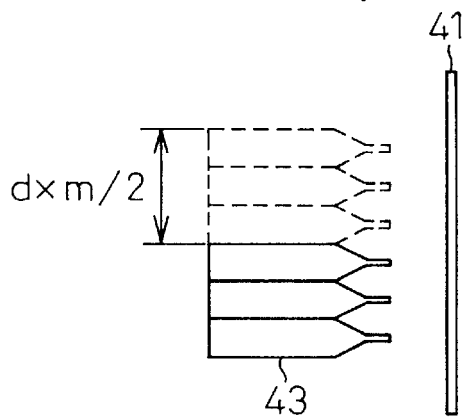 (5) 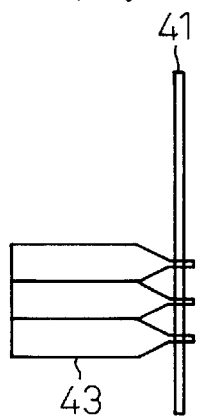 (6) 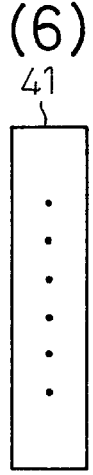
(7)  (8) 

Fig.13
(1)
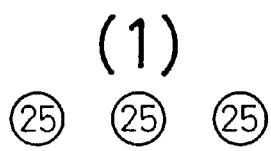
(2)
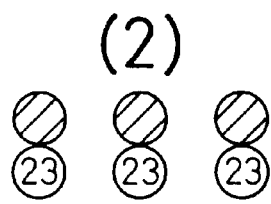
(3)
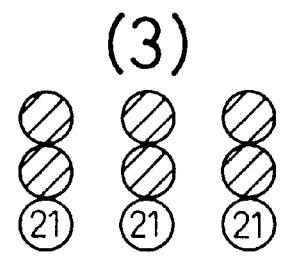
(4)
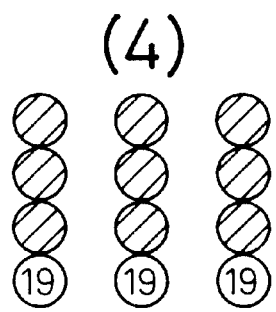
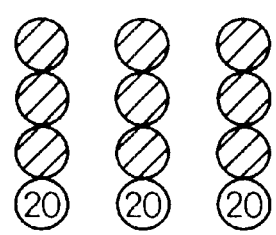
(5)
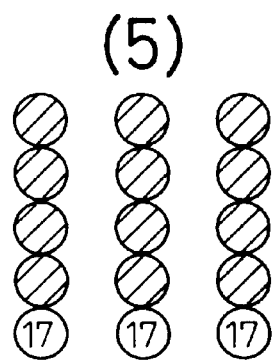
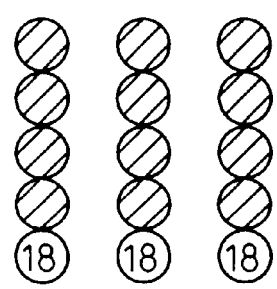
(6)
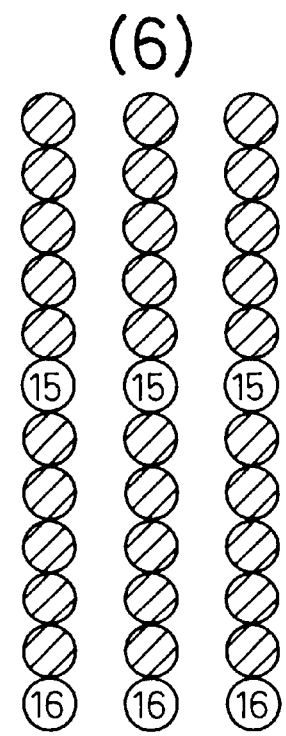
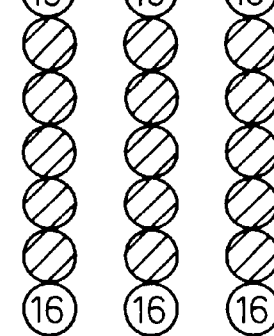

Fig.14
(1)
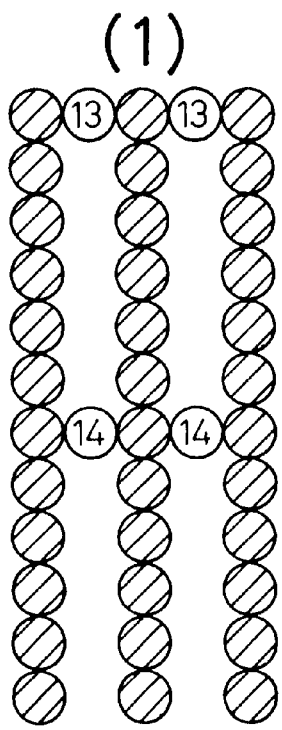
(2)
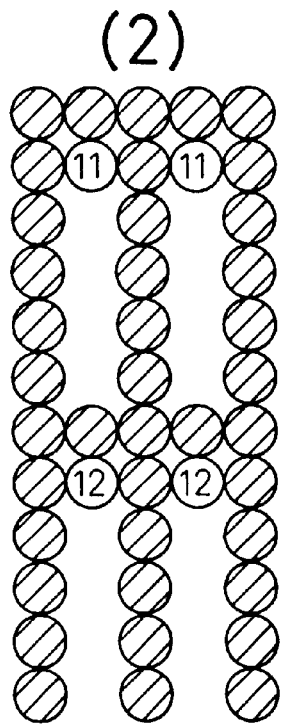
(3)
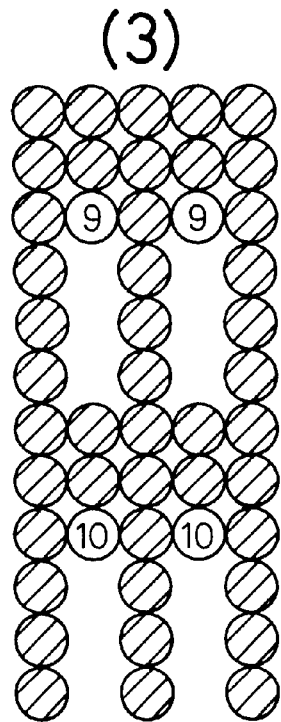
(4)
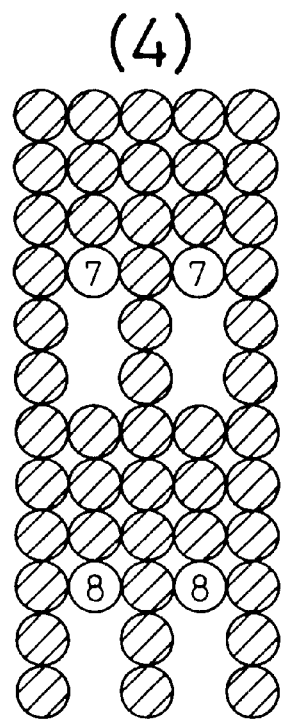
(5)
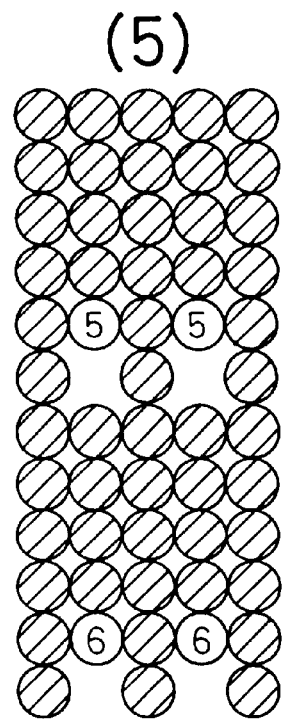
(6)
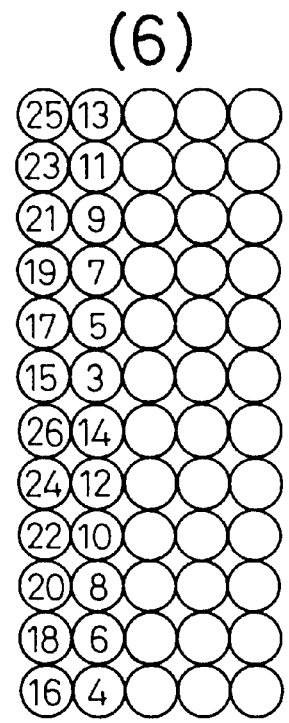

INK-JET PRINTER

This application is a continuation of International Application No. PCT/JP99/06822, filed on Dec. 6, 1999, which International Application was published by the International Bureau, in Japanese, on Jun. 14, 2001.

FIELD OF THE INVENTION

The present invention relates to an ink-jet printer. More particularly, the present invention relates to an ink-jet printer which comprises a head in which plural ink injection nozzles (simply referred to as nozzles hereinafter) are arranged at substantially equal intervals in the vertical scanning direction and which performs small line feeds and large line feeds.

BACKGROUND OF THE INVENTION

An ink-jet printer is a printer that sprays tiny droplets of ink, from a nozzle, onto a medium such as paper and creates an image by the attached droplets of ink. In the case of a monochrome printer, only one color of ink is used but, in the case of a color printer, four or more kinds of nozzles that spray four or more colors such as cyan, magenta, yellow, and black are used.

FIG. 1 is a cross sectional view of an ink-jet printer. In response to the outset of printing, a send roller 11 starts to rotate and a medium (sheet of paper) stacked in a paper cassette 10 is sent out along a guide 12. The sent-out sheet of paper is sent to the part under a head 20 under a roller 13 and interposed between paper feed rollers 14 and 15. By driving the paper feed rollers 14 and 15 rotationally, it is possible to feed the sheet of paper by a desired amount. The head 20 comprises a nozzle 21 and ink is sprayed from the nozzle 21 by driving an actuator that is not shown. The head 20 can move along a guide 22 in the direction perpendicular to that in which the paper moves and, in general, the movement of the head is called the main scanning, its direction, the main scanning direction, and the direction perpendicular thereto, that is, the moving direction of the sheet of paper is called the vertical scanning direction. By spraying ink at the positions of dots to be printed during a single main scan, the dots of a row corresponding to a nozzle are printed. After printing by the single main scan, the sheet of paper is fed by the amount of a row and the dots of the row are printed again, then the dots of the next row are printed. By repeating the above-mentioned action, printing on the entire surface of the sheet of paper is achieved. The sheet of paper onto which printing has been completed is ejected to a tray 16. The part denoted by reference number 3 is a member to prevent the tip of the nozzle 21 from drying and clogging and covers the tip of the nozzle 21 when it is not printing.

If printing of the dots of a row is performed by only one nozzle during a single main scan, it is necessary to perform the main scanning many times in order to print a sheet of paper, bringing about a problem that a long time is required for printing, that is, that the printing speed is slow. Therefore, plural nozzles are arranged in the vertical scanning direction and printing speed is improved by printing plural dot rows simultaneously during the single main scan.

FIG. 2 is a diagram that shows an example of an arrangement of the nozzles on the head of a color ink-jet printer. FIG. 2 (1) shows an example in which each color nozzle is arranged in a column in the vertical scanning direction and a black ink head 31K, a cyan ink head 31C, a magenta ink head 31M, and an yellow ink head 31Y are arranged shifted to the right one by one in the main scanning direction. On each head, plural (m) nozzles 32-1 to 32-m are arranged at intervals of a whole number multiple of the dot pitch. In order to spray ink of each color to the same dot, ink is sprayed from each color head delayed by the time determined by the distance between heads in the main scanning direction and the speed of the main scanning.

It is necessary to provide a mechanism, which is composed of materials such as piezo elements, to spray ink from each nozzle, and as a result a space of a certain extent is required. Therefore, it is impossible to arrange nozzles adjacently so as to correspond to each dot, but the nozzles are arranged in the vertical scanning direction at fixed intervals. Printing actions in the case where nozzles are arranged as described above are described later.

FIG. 2 (2) shows an arrangement in which plural columns of nozzles arranged at fixed intervals in the vertical scanning direction are arranged so that the intervals between arranged nozzles in the vertical scanning direction are substantially reduced. Similarly to FIG. 2 (1), heads of four colors, black, cyan, magenta, and yellow are provided and two columns of nozzles 34-1 and 34-2 are provided. The two columns of nozzles are arranged in the vertical scanning direction, being shifted from each other by half the nozzle interval, and the nozzles of the two columns are arranged at equal intervals in the vertical scanning direction, when viewed from the main scanning direction. The interval is half the nozzle interval of one column of nozzles and this substantial interval is referred to as the arrangement interval in the vertical scanning direction. In order to spray ink onto the same dot column, ink is sprayed from the nozzle of each column, being delayed by the difference in time determined by the deviation in the main scanning direction and the main scanning speed. In this way, the same printing is achieved as that when nozzles are arranged at half the intervals of those of nozzles in each column. If the number of columns of nozzles is increased, the substantial arrangement interval can be reduced by the corresponding amount, and if, for example, six columns of nozzles, the arrangement pitch of which is six-dot, are provided, it is possible to print the adjacent dots simultaneously by a single main scan. The arrangement, however, in which nozzles are arranged densely in the vertical scanning direction, is difficult to realize, from the standpoints of the head size and cost. The present invention focuses on a head on which nozzles are arranged at intervals larger than a single dot in the vertical scanning direction. Although the head of a color ink-jet printer is shown in FIG. 2, the present invention can be applied to both a monochrome ink-jet printer and a color ink-jet printer. For simplicity, description is made below with reference to a monochrome ink-jet printer as an example, but the present invention is not restricted to this case.

FIG. 3 shows a head on which m nozzles 36-1 to 36-m are arranged at fixed intervals (four-dot pitch) in the vertical scanning direction, and indicates the relative movement during printing using this head between the head and the medium (paper) in the vertical scanning direction. Here, a case where a belt-shaped vertical line is printed, is described. The head performs the main scanning at the position denoted by 35a and dots in m rows are printed by the m nozzles. In this way, m horizontal lines with one-dot width are printed at a four-dot pitch and a space corresponding to three-dot width is left between two adjacent horizontal lines. Next, the head moves in the vertical scanning direction relative to the medium to the position denoted by 35b. This movement is called the small line feed. The main scanning is performed at the position and m dot rows are printed. The m dot rows printed at this time are downwardly adjacent to the m dot rows previously printed, and they form m horizontal lines with two-dot widths. This time, a space corresponding to two-dot width is left between two adjacent horizontal lines. Similarly, the head is moved to the position denoted by 35c by the small line feed, performs the main scanning, and m dot rows are printed. By this, they form m horizontal lines with three-dot width and a space corresponding to a one-dot width is left between two adjacent horizontal lines. Furthermore, the head is moved to the position denoted by 35d by the small line feed, performs the main scanning, and m dot rows are printed. In this way, a rectangle with 4×m dot width in the vertical scanning direction is printed. Then, the head is moved to the position denoted by 35e. This is called the large line feed. The amount of movement of the large line feed is (4×m−3) times the dot pitch. Printing over the entire surface of the medium can be achieved by repeating the action described above.

As shown in FIG. 3, when the above-mentioned printing action is performed, the first four dot rows are printed by the ink sprayed from the first nozzle, the next four dot rows are printed by the ink sprayed from the second nozzle, and the last four dot rows of the 4×m dot rows are printed by the ink sprayed from the m-th nozzle, and this is repeated for each of the 4×m dot rows.

The nozzle is a fine hole and plural nozzles are formed simultaneously by processes such as a press working. Although the mold for press working is created precisely and nozzles are formed by a precise press working, it is impossible to create every nozzle so as to be perfectly identical to another, and it is unavoidable that deviations in the nozzle positions and in the spraying angles of ink are caused. The deviations in the nozzle positions lead to the deviations in the positions on the medium to which ink is sprayed. The deviations in the spraying angles of ink result in the deviations in the ink-sprayed positions by the amount of the distance from the nozzle tip to the medium multiplied by the deviation in the spraying angles. Therefore, the sum of the deviations due to these two factors is the actual deviations and in fact the deviations in the ink-sprayed positions are larger than those in the spraying angles.

FIG. 4 shows the case where the positions of the medium to which ink is sprayed from the three nozzles 37-1 to 37-3 are deviated to the positions denoted by 38-1 to 38-3 as shown schematically. In this case, it is shown that the deviations are supposed to occur only in the vertical scanning direction, but actually they deviate in every direction. It is assumed that the ink sprayed from the nozzles 37-1 and 37-3 is deviated upward and that from the nozzle 37-2 is deviated downward. If printing is performed by four dot rows using this head as shown in FIG. 3, the four dot rows deviate in the same direction by the same amount, therefore, there appears a white horizontal line (if the medium is white) between the four dot rows printed by the ink sprayed from the nozzle 37-1 and those printed by the ink sprayed from the nozzle 37-2, and a thick horizontal line appears between the four dot rows printed by the ink sprayed from the nozzle 37-2 and those printed by the ink from the nozzle 37-3 because two rows overlap each other. As a result, thick and white horizontal lines appear at four dot row pitch. If the spraying angle deviates in the main scanning direction, jitters appear in the vertical lines at a four dot pitch.

FIG. 5 is a diagram that illustrates how to manufacture the ink-spraying nozzles. As shown in FIGS. 5 (1) and (2), nozzles are manufactured by pressing a thin nozzle plate 41 by a mold 42 on which plural pins having a nozzle hole shape are arranged at fixed intervals. Since it is difficult to manufacture a mold that has many pins at the same intervals (nozzle pitch) as those of the actual nozzles, a mold with half the number (m/2) of nozzles of the actual number (m) of nozzles is manufactured at the intervals (2d) twice the actual nozzle pitch d. By pressing this mold, m/2 nozzle holes at intervals of 2d are manufactured as shown in FIG. 5 (3). Then, the relative position between the mold and the nozzle plate 41 is shifted by the nozzle pitch d as shown in FIG. 5 (4) and pressing is performed as shown in FIG. 5 (5). In this way, m nozzles arranged at intervals of d are manufactured as shown in FIG. 5 (6). It will be easier to manufacture a mold if the intervals between pins is set to 3d or wider, the number of pins is further decreased, and the number of pressing times is increased.

Different from the manufacturing method shown in FIG. 5, there can be another manufacturing method as shown in FIG. 6. As shown in FIGS. 6 (1) and (2), for example, a mold on which m/2 pins are arranged at intervals of d is first manufactured and m/2 nozzle holes are manufactured at intervals of d by pressing the nozzle plate 41. Then, the relative position between the mold and the nozzle plate 41 is shifted by d×m/2 and pressing is performed as shown in FIG. 6 (5). In this way, m nozzles arranged at intervals of d are manufactured as shown in FIG. 6 (6). In this method, however, distortion may be caused in the central part of the nozzle plate 41 as shown in FIGS. 6 (7) and (9) because a force is applied to each of the upper half and the lower half, respectively, during the two-time press working. Moreover, there is another problem that it is difficult to manufacture pins at narrow intervals, therefore, in general, the nozzle holes in the nozzle plate are manufactured by the method described in FIG. 5.

As described above, when nozzle holes are manufactured by pressing the nozzle plate with pins, the direction of the holes is deviated and the deviation in spraying angle is caused if, for example, the direction of the pin deviates from the perpendicular. When nozzle holes are manufactured by the manufacturing method described in FIG. 5, the spraying angles are almost the same because two adjacent nozzles are manufactured by pressing the same pin. Therefore, the thick and thin horizontal lines caused by the deviation in the spraying angles of each nozzle described in FIG. 4 appear at the double eight-dot pitch and become more conspicuous. If the interval between pins are made more than three times, the thick and thin horizontal lines appear at more than three times dot pitch, becoming still further conspicuous. On the other hand, when the spraying angle deviates in the main scanning direction and jitters appear in the vertical lines, they become more conspicuous because the intervals of the jitters are lengthened.

As explained above, when printing is performed by repeating the small line feeds and the large line feeds described in FIG. 3 using the head on which plural nozzles are arranged, a problem is caused that variations in printing density in the horizontal lines and the jitters in the vertical lines are caused to occur due to the deviation of the spraying angle of the nozzle and the image quality is deteriorated. In order to solve such a problem, U.S. Pat. No. 4,198,642 has disclosed the technique called the "Interlaced method". Moreover, Japanese Unexamined Patent Publication (Kokai) No. 11-28827, Japanese Unexamined Patent Publication (Kokai) No. 11-34398, Japanese Unexamined Patent Publication (Kokai) No. 9-11509, and Japanese Unexamined Patent Publication (Kokai) No. 9-71009 have disclosed the improved techniques of the "Interlaced method."

In the Interlaced method, integers N and k are selected so that they have no common divisor in the case where a head, on which N nozzles are arranged at intervals of k times the dot pitch, is used for printing, and a line feed by a fixed amount is performed each time a single main scan is completed, thereby the entire surface can be printed with an identical amount of line feed. When, however, printing is performed with the Interlaced method, it is necessary in general to limit the number of driven nozzles, not equally using every nozzle arranged on the head, or to vary the nozzle driving ratio for each nozzle. In the ink-jet printer, if the nozzle driving ratio differs from nozzle to nozzle, the state of nozzle changes, the change in ink viscosity due to the contact of ink with the external air at the nozzle portion and the variations in driving ability due to the difference in the nozzle driving ratio are caused to occur, resulting in a problem that the variations in the spraying characteristics of ink between nozzles are increased and that the printing speed is substantially lowered because of the limitation to the number of driven nozzles.

Therefore, in order to perform printing with the same driving ratio for all the nozzles mounted on the head of an ink-jet, the Interlaced method, in which printing is possible with a fixed amount of line feed as described above, cannot be used but it is necessary to perform the relative movement by combining the small line feeds and the large line feeds for printing. The above-mentioned method, however, in which the small line feeds and the large line feed are combined, has a problem that the image quality is deteriorated by the difference in the spraying angle between nozzles.

SUMMARY OF THE INVENTION

The present invention has been developed in order to solve these problems and the object of the present invention is to realize an ink-jet printer that can achieve a high quality image even when printing is performed with the method in which the small line feeds and the large line feeds are combined.

In order to realize the above-mentioned object, in the ink-jet printer of the present invention, the amount of the small line feed is a whole number multiple of the arrangement interval of nozzles plus one dot pitch and the thick and thin horizontal lines and the jitters in the vertical lines are made inconspicuous by causing them to occur at a fine pitch by printing adjacent dot rows with nozzles that have different spraying angles.

In other words, the ink-jet printer of the present invention comprises B (B is an integer) of ink spraying nozzles that spray the same ink, which are arranged at substantially fixed nozzle intervals in the vertical scanning direction, and a head that can move in the main scanning direction perpendicular to the vertical scanning direction, and a vertical scanning mechanism that relatively moves a memory medium in the vertical scanning direction with respect to the ink head, and is characterized in that the nozzle interval is A times (A is an integer) the dot pitch (d) and that printing is achieved by repeating a small line feed printing and a large line feed printing, wherein the small line feed printing is an action in which the single-time printing scanning (main scanning) in the main scanning direction and another single-time printing scanning, after a small line feed to relatively move the memory medium in the vertical scanning direction with respect to the ink head by the amount of n times (n is an integer) the nozzle interval plus one dot pitch (($A \times n+1) \times d$) is performed, are performed ($C \times A-1$) times repeatedly, and the large line feed printing is an action in which a large line feed of ($B \times A-(A \times n+1)(C \times A-1)) \times d$ is performed.

FIG. 7 is a diagram that illustrates the principle of the present invention. As shown schematically, m nozzles $51$-$1$ to $51$-m are arranged at four-dot pitch. The spraying angle of each nozzle is assumed to be different from any other. First, the single-time printing scanning (main scanning) is performed in the main scanning direction at the positions of the leftmost nozzles $51$-$1$ to $51$-m. At this time, it is arranged that the dot row at the top end of an image is printed by the nozzle $51$-$4$. Then, after the small line feed at five-dot pitch is performed, the single-time printing scanning is performed. The positions of nozzles $51$-$1$ to $51$-m at this time are shown at the second leftmost positions. The group of a small line feed and a single-time printing scanning is repeated three times. By this, the row consisting of the four dots $55$-$4$ to $55$-$1$ on the right-hand side is printed by the set of the nozzles $51$-$4$ to $51$-$1$ denoted by reference number $52$, and similarly, the row consisting of the four dots $56$-m to $56$-m-$3$ on the right-hand side is printed by the set of the nozzles denoted by reference number $53$. Since the set of the adjacent four dot rows is printed by the different nozzles, respectively, as described above, the difference, if any, in the spraying angle of ink from the nozzle is less conspicuous because the deviation occurs for each dot row.

When the set of the small line feed and the single-time printing scanning is repeated three times, the dot rows of $51$-$4$ to $56$-m-$3$ are printed densely. The dot rows of $57$-m, $57$-m-$1$, and $57$-m-$2$ that correspond to the three nozzles located from the leftmost positions in the set of the nozzles denoted by reference number $54$ are printed by the above-mentioned action, but the position that corresponds to $57$-$1$ is left blank. The large line feed is performed so that the blank dot row is printed by the nozzle $51$-$1$. Therefore, the amount of movement by the large line feed is ($4 \times m-5 \times 3$). By repeating the same action, printing is performed on the entire surface.

Here, the above-mentioned action is represented using generalized expressions. For example, if the arrangement pitch of nozzles is A times the dot pitch d and the number of nozzles is B, the amount of movement by the small line feed is (A+1) d, and the total amount of movement by the small line feed is (A+1)(A−1) d because the small line feed is performed (A−1) times. The large line feed is performed so that the foremost nozzle in the initial state moves to the position next to the rearmost nozzle. The amount of movement required for the foremost nozzle to move to the position next to the rearmost nozzle is B×A×d. As the total amount of movement by the small line feed is (A+1)(A−1) d, as described above, the amount of movement by the large line feed is obtained as (B×A−(A+1)(A−1)) d by subtracting the total amount (A+1)(A−1) d from B×A.

In the example shown in FIG. 7, as the spraying angle of each nozzle differs from any other, the amount of movement by the small line feed is that of movement of the nozzle to the position one dot ahead. When nozzles are manufactured by the method described in FIG. 5, adjacent nozzles have the same spraying angle. When n adjacent nozzles have the same spraying angle, the movement to the position one dot ahead of the n-th nozzle is required for the small line feed. Therefore, the amount of movement by the small line feed is (A×n+1) d, and that by the large line feed is (B×A−(A× n+1)(A−1)) d. It is also possible to design that the small line feed causes a movement to the position one dot ahead of the nozzle that is a whole number multiple of n nozzles ahead.

In the above description, it is assumed that each dot row is printed by the single-time printing scanning (main scanning) by a single nozzle. In general, such an action is called a single-pass recording mode. On the contrary, such an action in which each dot row is printed by multiple-time main scanning by plural nozzles is called the multi-pass recording mode. This applies to the case of a monochrome head, and in the case of a color printer, an action in which a dot row is printed by the single main scan for each color is called the single-pass recording mode, and that in which a dot row is printed by the multiple-time main scanning for each color is called the multi-pass recording mode.

FIG. 8 is a diagram that illustrates the small line feed and the large line feed when the principle of the present invention is further generalized. As shown schematically, it is assumed that B nozzles are arranged at A dot pitch and n adjacent nozzles have the same spraying angle. Moreover, the printing is carried out in the multi-pass recording mode in which a dot row is printed by performing the main scanning C times. The amount of movement by the small line feed is $(A \times n+1)$ d and this is repeated $(C \times A-1)$ times, therefore, the total amount of movement by the small line feed is $(A \times n+1) \times (C \times A-1)$ d. As a result, the amount of movement by the large line feed is $(B \times A - (A \times n+1)(C \times A-1))$ d.

The printer can be one that operates in the single-pass recording mode or in the multi-pass recording mode, or one that can select either arbitrarily.

When adjacent nozzles spray ink simultaneously, a problem concerning crosstalk is caused, therefore, it is desirable to control so that adjacent nozzles are not driven simultaneously in the case of the multi-pass recording mode.

When plural dots are printed continuously also in the main scanning direction in the multi-pass recording mode, it is possible to randomly determine the dot positions to be printed in each time out of C times. In this way, the influence by the variations in the spraying direction of ink from the nozzle is made less conspicuous.

BRIEF DESCRIPTION OF DRAWINGS

FIGS. 2 (1) and (2) are diagram that show examples of arrangement of plural ink spraying nozzles arranged at fixed intervals in the vertical scanning direction.

FIGS. 5 (1) to (6) are diagrams that illustrate a method of manufacturing plural ink spraying nozzles.

FIGS. 6 (1) to (8) are diagrams that illustrate another method of manufacturing plural ink spraying nozzles.

FIGS. 13 (1) to (6) are diagrams that show the order in which dots are printed when printing a belt-shaped vertical line in the second embodiment.

FIGS. 14 (1) to (6) are diagrams that show the order in which dots are printed when printing a belt-shaped vertical line in the second embodiment.

DESCRIPTION OF THE PREFERRED EMBODIMENTS

Figure 1:
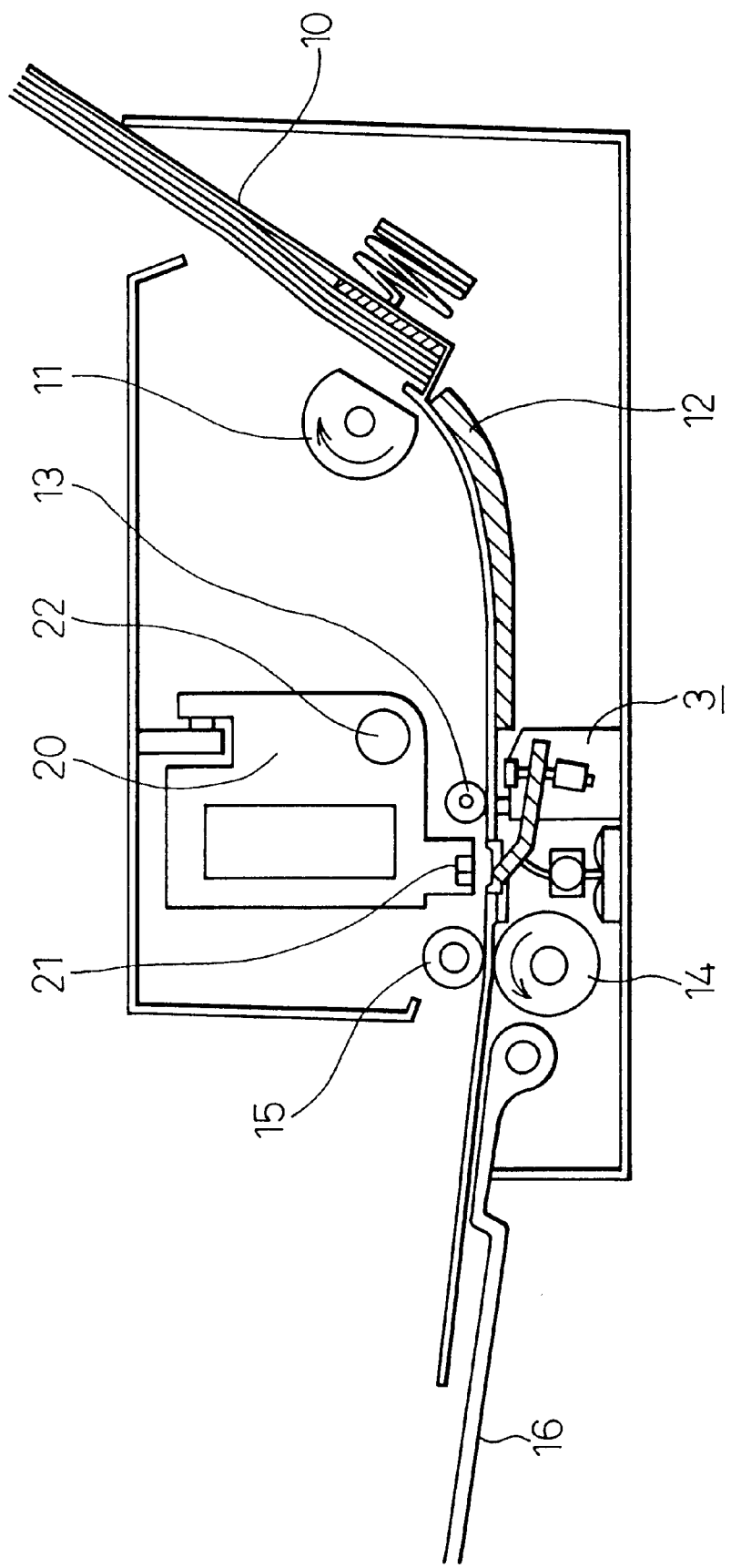
FIG. 1 is a cross sectional view of an ink-jet printer.
Figure 3:
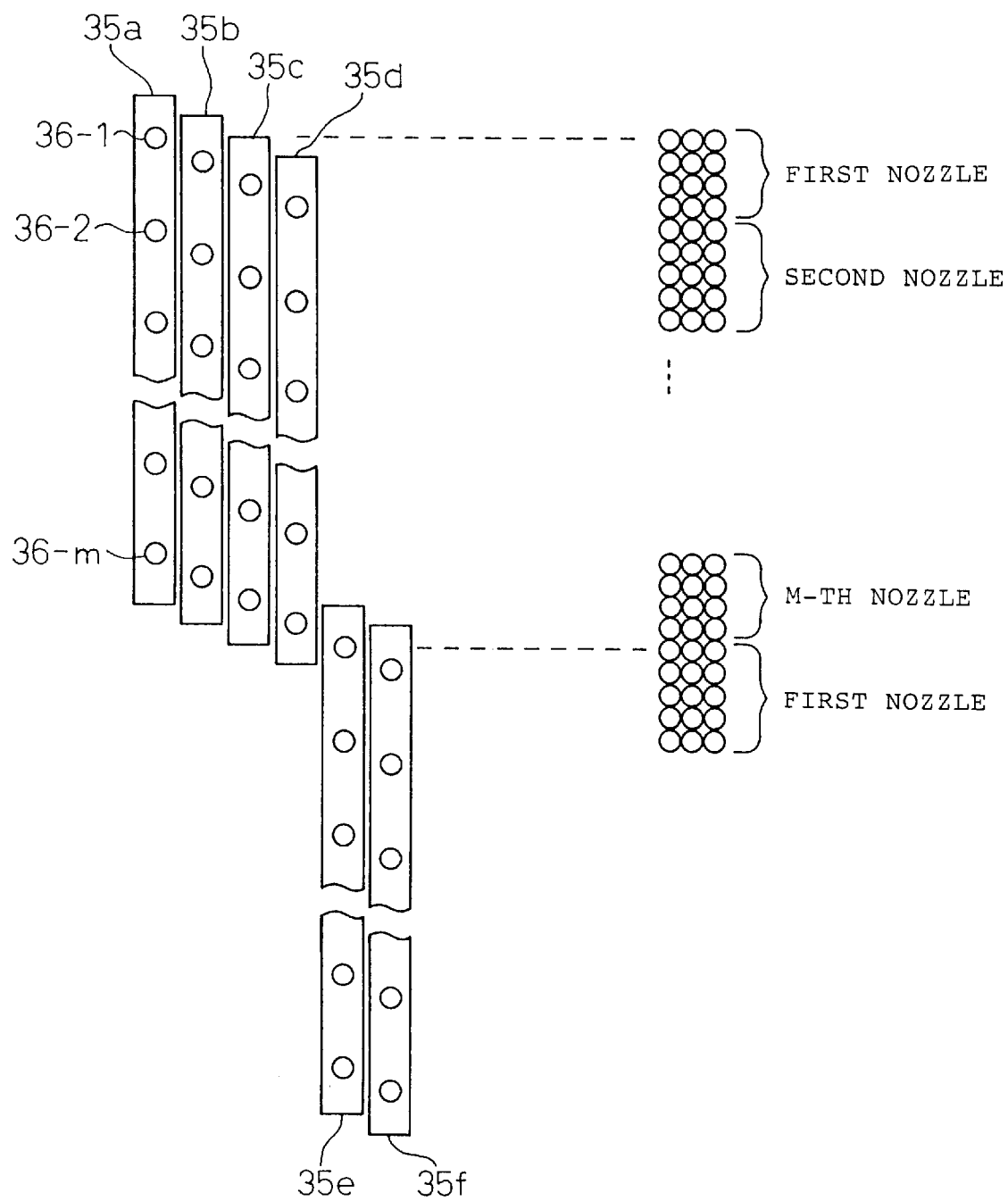
FIG. 3 is a diagram that illustrates the action of the relative movement between the head and the medium in the vertical scanning direction when printing is performed with a head having plural ink spraying nozzles shown in FIGS. 2 (1) and (2).
Figure 4:
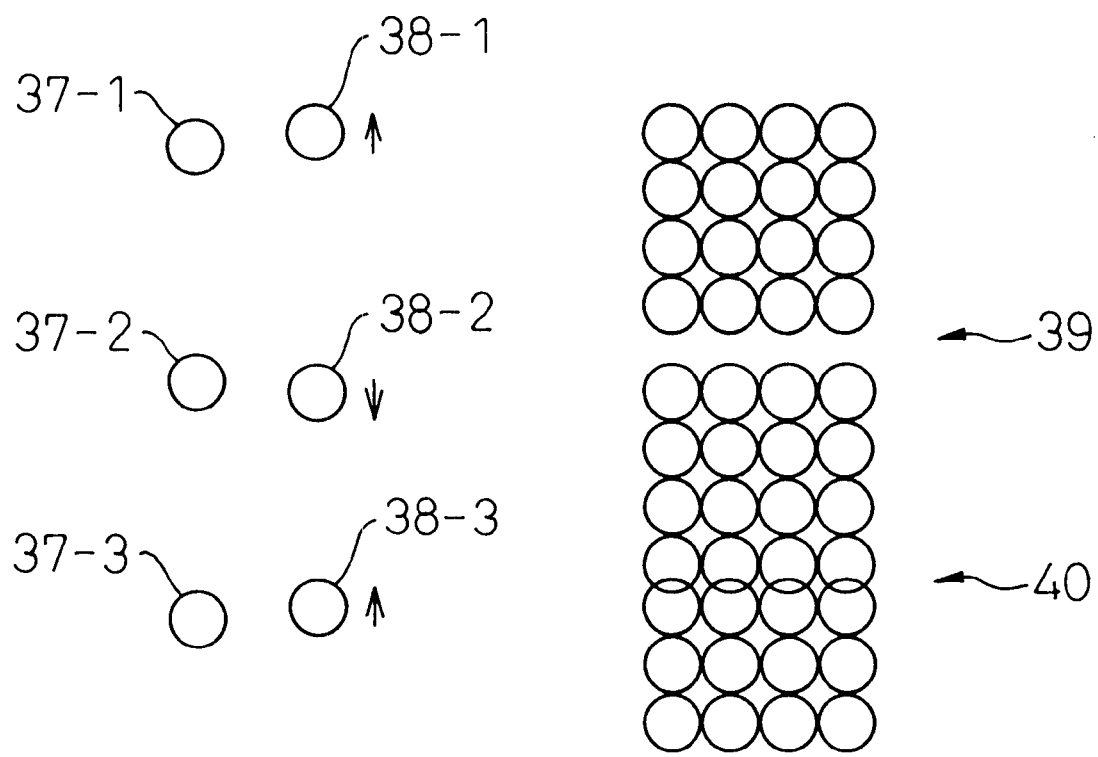
FIG. 4 is a diagram that illustrates the influence of the deviation in the ink spot position for each nozzle.
Figure 7:
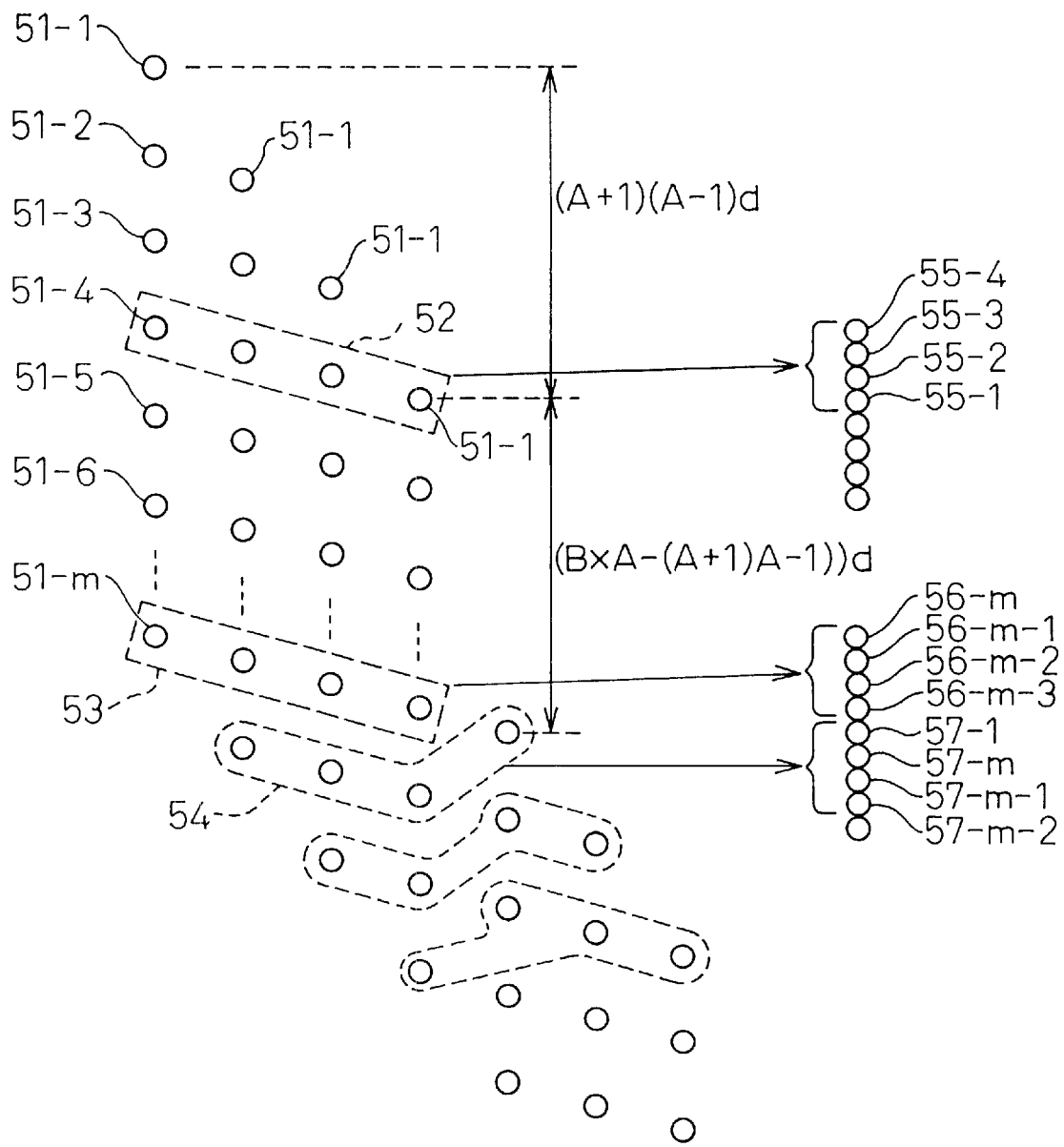
FIG. 7 is a diagram that illustrates the principle of the present invention.
Figure 8:
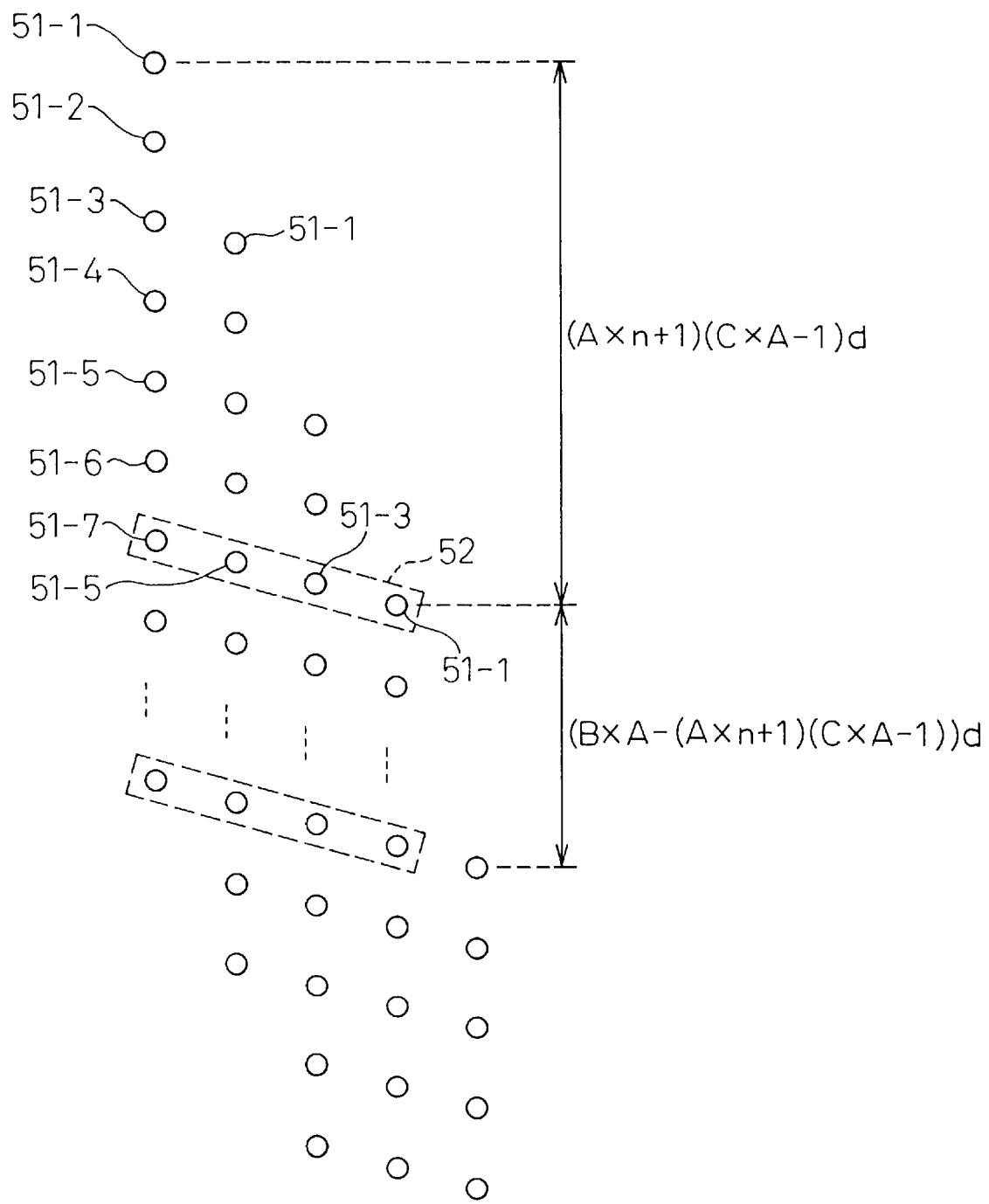
FIG. 8 is a diagram that illustrates the further generalized principle of the present invention.

The preferred embodiments of the present invention are described below. For simplicity, it is assumed that the ink-jet printer in the embodiments is a monochrome printer, but it is possible to apply the present invention to a color printer, and in this case, all that is required is to perform the action to be described below for the head of each color. The ink-jet printer in the embodiments has a cross sectional view as shown in FIG. 1, differing from a conventional one in the movement of a medium with respect to the head in the vertical scanning direction. Therefore, only the different parts are described and a description of other parts is omitted.

Figure 9:
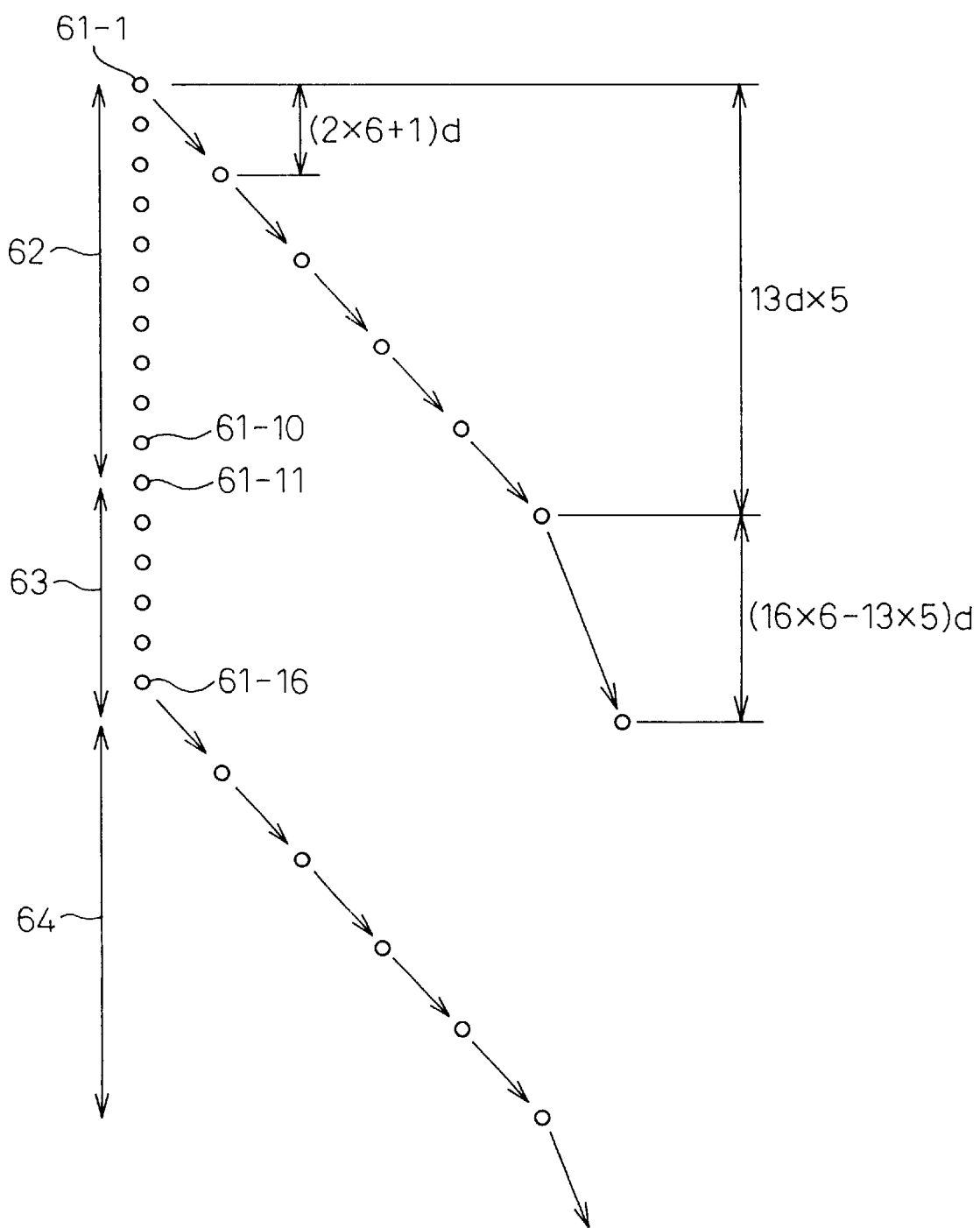
FIG. 9 is a diagram that shows the nozzle arrangement and the relative movement between the head and the medium in the vertical scanning direction in the first embodiment of the present invention.

FIG. 9 is a diagram that shows the arrangement of nozzles on the head of the ink-jet printer in the first embodiment and the relative movement of the medium with respect to the head in the vertical scanning direction. As shown schematically, 16 nozzles 61-1 to 61-16 are arranged in a column at six-dot pitch intervals. These nozzles are manufactured by the method shown in FIG. 5 and two adjacent nozzles have the same ink spraying angle. This printer operates in the single-pass recording mode and prints a dot row by the single main scan. Therefore, A in the expressions to calculate the amount of movement by the small line feed and the large line feed is 6 in this case, and B is 16, C is 1, and n is 2. As a result, the amount of movement by the small line feed is $(2 \times 6+1)$ d, that is, 13-dot pitch, and that by the large line feed is $(16 \times 6 - 13 \times 5)$ d, that is, 31-dot pitch. In FIG. 9, when a vertical line is printed, printing starts from the position of the nozzle 61-11, which is the foremost end of the vertical line. Reference number 62 denotes the part that is not printed by the action before the first large line feed has taken place, reference number 63 denotes the part all the dot rows of which are printed by the action before the first large line feed has taken place, and reference number 64 denotes the part that is printed by the action before the first line feed has taken place and by the action after the first large line feed has taken place and before the second large line feed has taken place.

Figure 10:
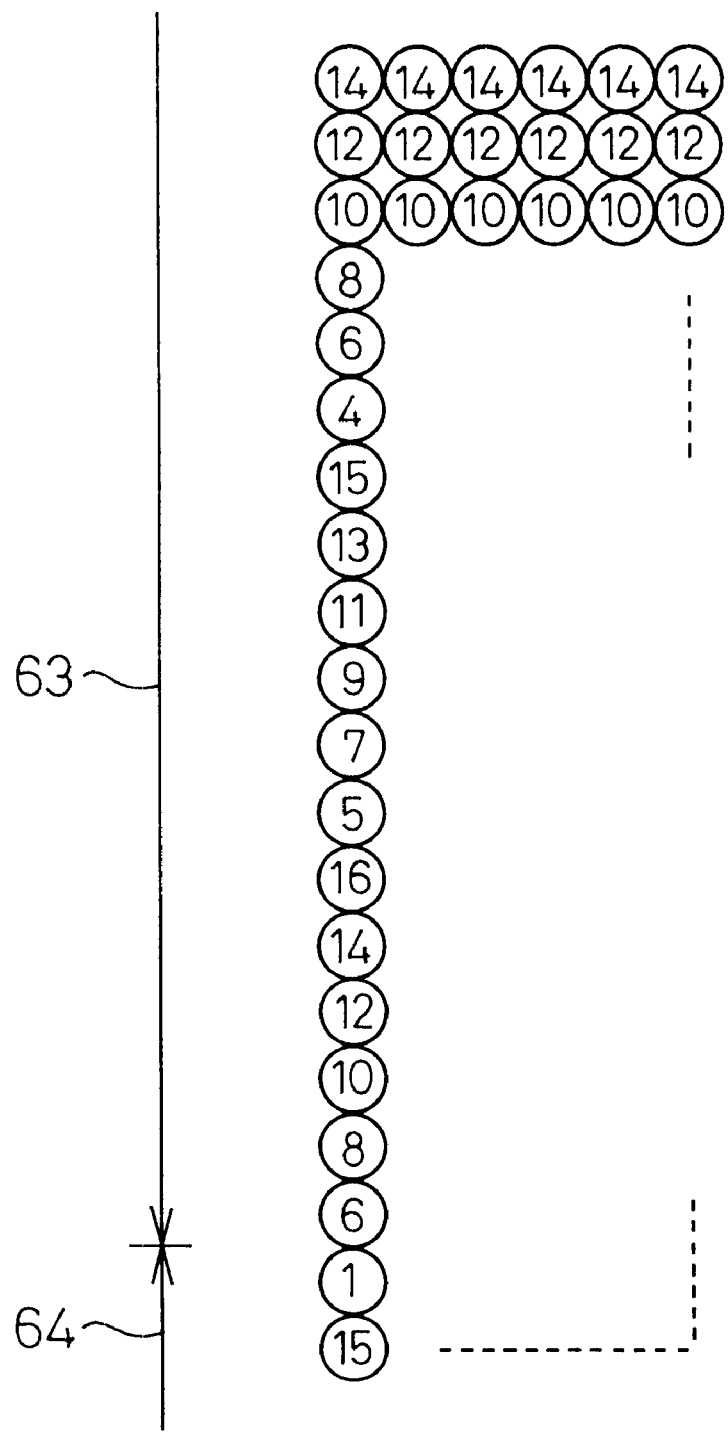
FIG. 10 is a diagram that shows each nozzle that prints each dot when printing a belt-shaped vertical line in the first embodiment.
Figure 11:
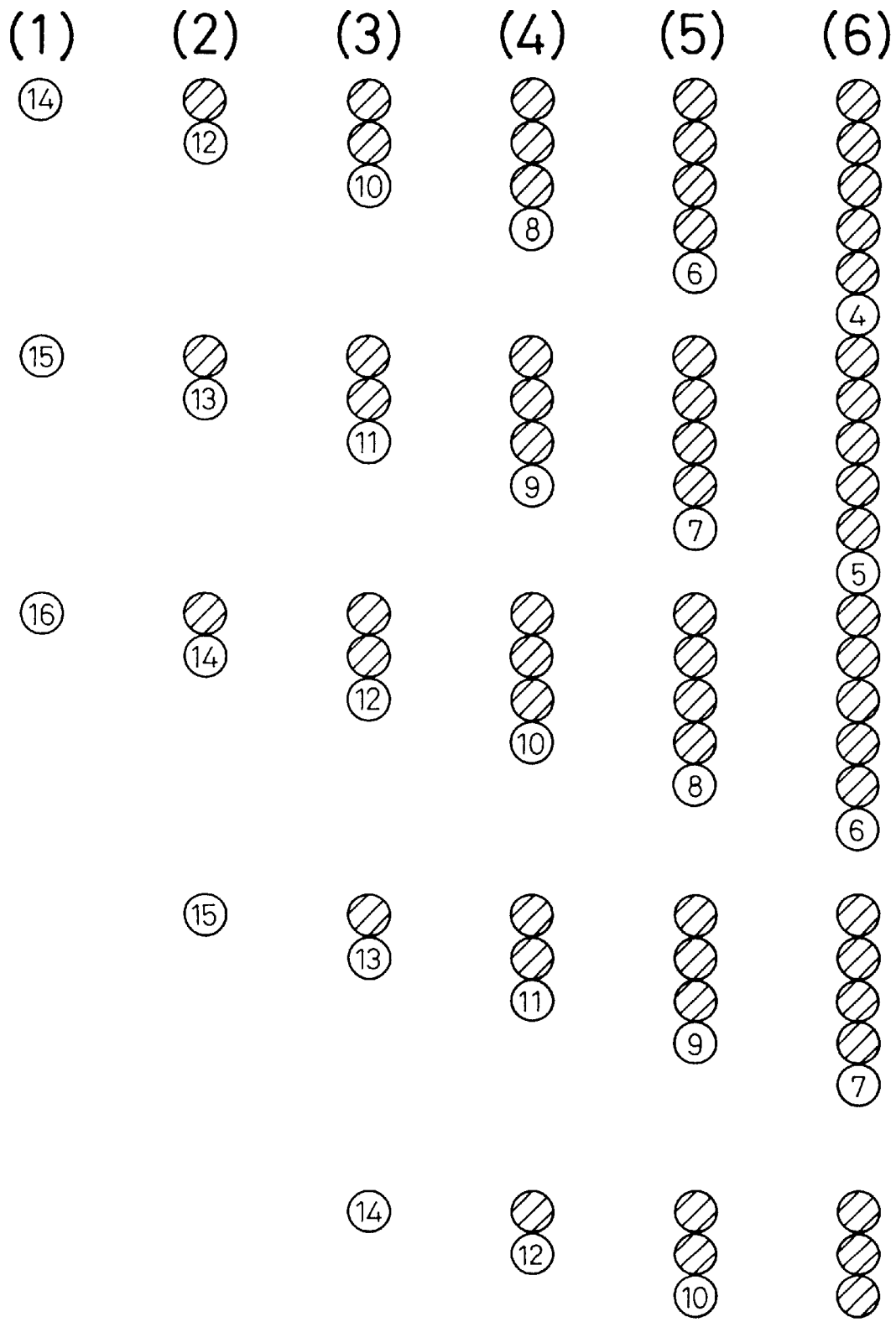
FIGS. 11 (1) to (6) are diagrams that show the order in which dots are printed when printing a vertical line in the first embodiment.

FIG. 10 is a diagram that shows the nozzles that print each dot when a belt-shaped vertical line is printed in the first embodiment, and FIG. 11 is a diagram that shows the order in which each dot is printed. As shown schematically, adjacent dot rows are printed by nozzles that are apart from each other by a distance corresponding to two or more nozzles, therefore, the spraying angles are always different. As a result, even though the spraying angles are different, the unevenness in density of horizontal lines and the jitter of vertical lines are not conspicuous because they appear at a short pitch.

Figure 12:
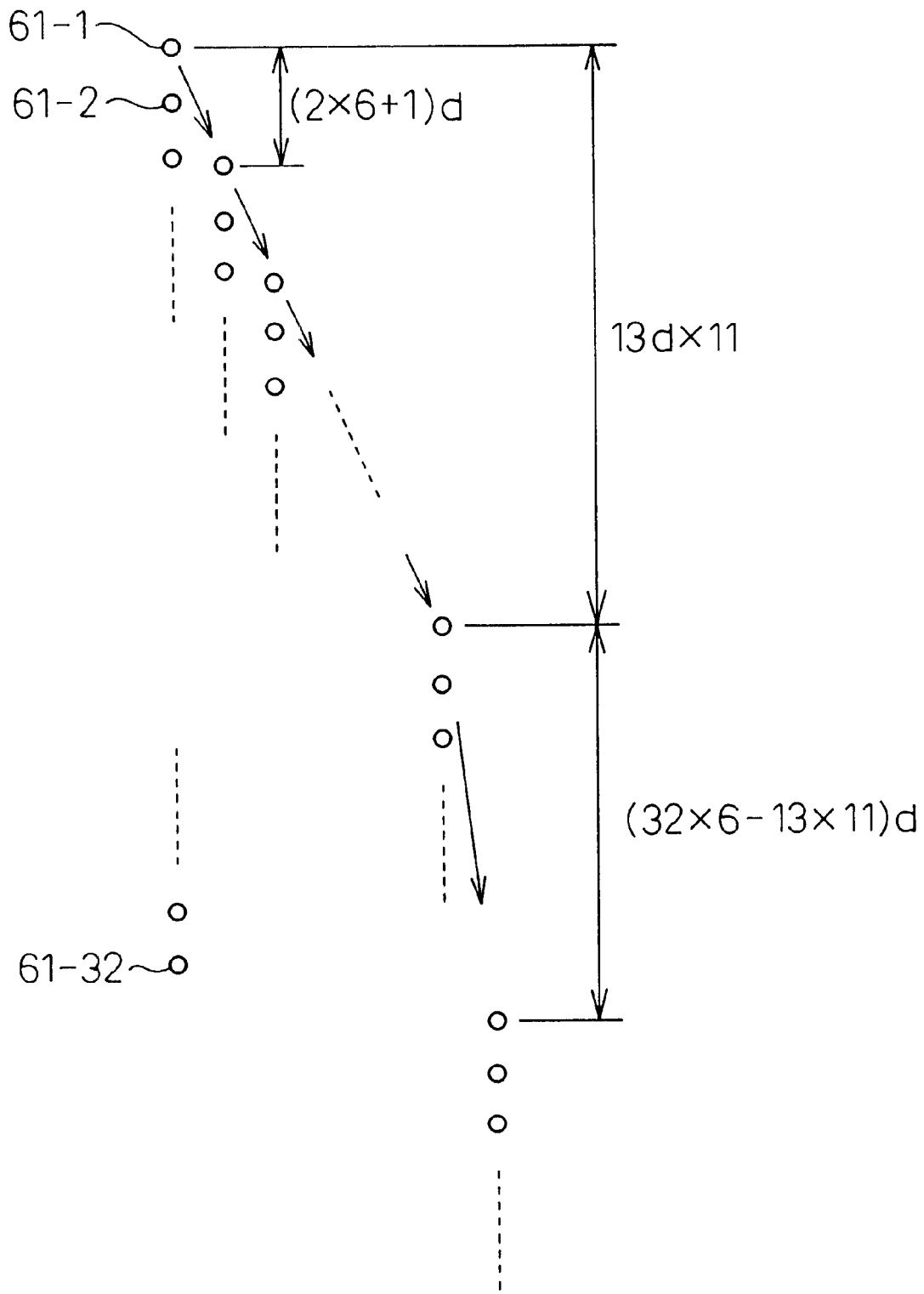
FIG. 12 is a diagram that shows the nozzle arrangement and the relative movement between the head and the medium in the vertical scanning direction in the second embodiment of the present invention.

FIG. 12 is a diagram that shows the arrangement of nozzles on the head of the ink-jet printer in the second embodiment and the relative movement of the medium with respect to the head in the vertical scanning direction. As shown schematically, 32 nozzles 61-1 to 61-32 are arranged in a column at six-dot pitch intervals. These nozzles are manufactured by the method shown in FIG. 5 and two adjacent nozzles have the same ink spraying angle. This printer operates in the single-pass recording mode similarly to the first embodiment, but it also operates in the multi-pass recording mode in which a dot row is printed by two-time main scanning. The multi-pass recording mode is described here. A in the above-mentioned expressions to calculate the amount of movement by the small line feed and the large line feed is 6, B is 32, C is 2, and n is 2. Therefore, the amount of movement by the small line feed is (2×6+1) d, that is, 13-dot pitch, and that by the large line feed is (32×6−13×11) d, that is, 49-dot pitch.

FIG. 13 and FIG. 14 are diagrams that show the order in which each dot is printed when a belt-shaped vertical line is printed in the second embodiment and the nozzles that print each dot. As shown schematically, adjacent dot rows are printed by nozzles that are apart from each other by a distance corresponding to two or more nozzles. Moreover, since adjacent dots in a dot row is printed alternately by two nozzles, the deviation due to the difference in the spraying angles of nozzles is made less conspicuous.

Figure 15:
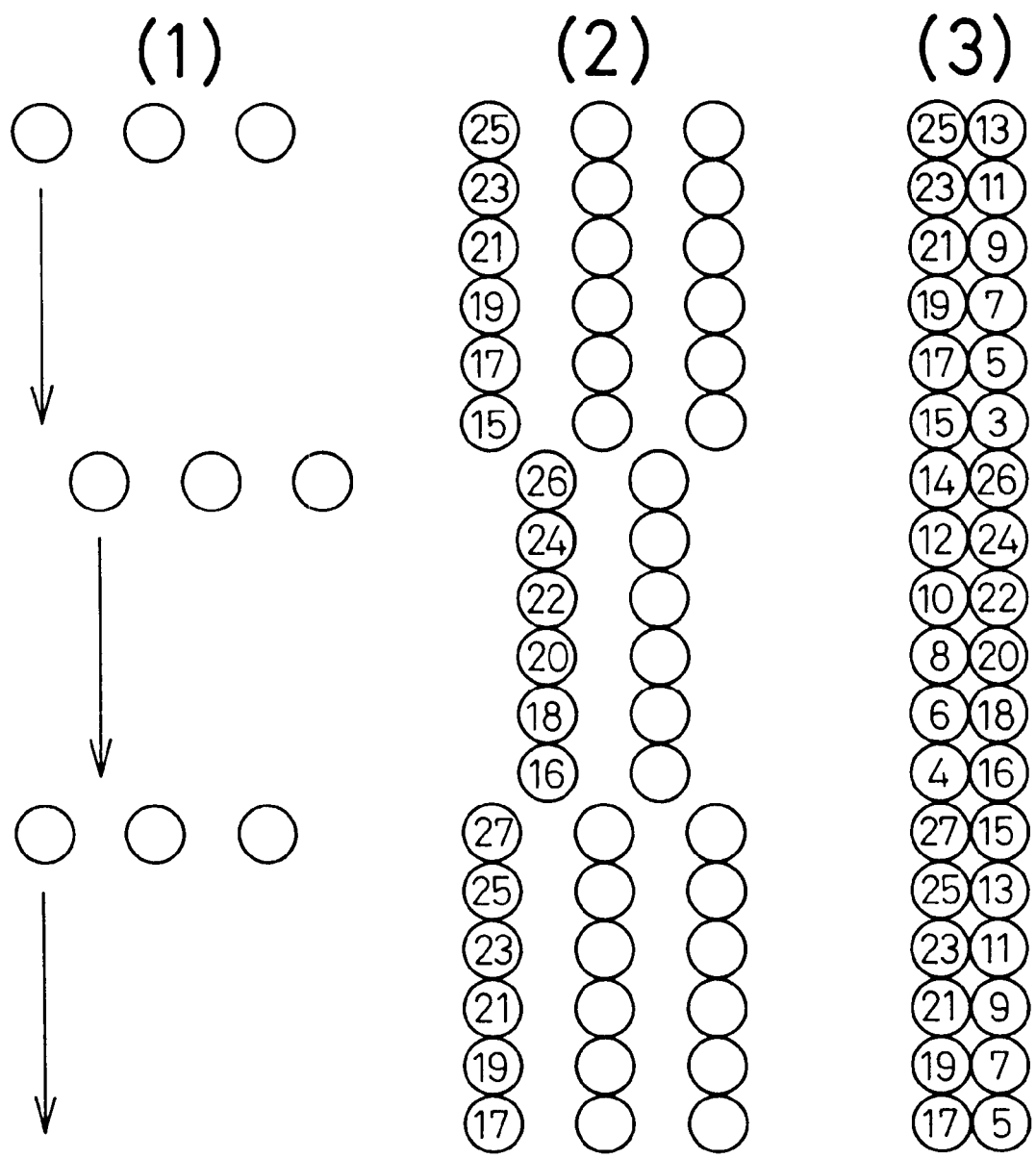
FIGS. 15 (1) to (3) are diagrams that show an example of modification of the order in which dots are printed when printing a belt-shaped vertical line in the second embodiment.

FIG. 15 is a diagram that shows the order in which each dot is printed when a belt-shaped vertical line is printed in the example of modification of the second embodiment. The relative movement of the medium with respect to the head in the vertical scanning direction is the same as that in the second embodiment and the same dot row is printed by the same two nozzles. As shown in FIG. 15 (1), however, the nozzles 61-25 and 61-26, for example, operate alternately to print dots in different columns during the main scanning. Similarly, if adjacent nozzles are made not to operate at the same time, six-dot columns are printed in the grid pattern as shown in FIG. 15 (2). Subsequently, the nozzle 61-13 prints the same dot row as that the nozzle 61-25 prints, the nozzle 61-14 prints the same dot row as that the nozzle 61-26 prints, and during this time, the dots remaining in the blank part are printed. Therefore, adjacent nozzles do not operate simultaneously. By repeating the above-mentioned action six times, each dot is printed by the nozzles shown in the figure in the pattern as shown in FIG. 15 (3). Although only two dot rows are shown in FIG. 15 (3), all that is required after this is to repeat the same action.

Figure 16:
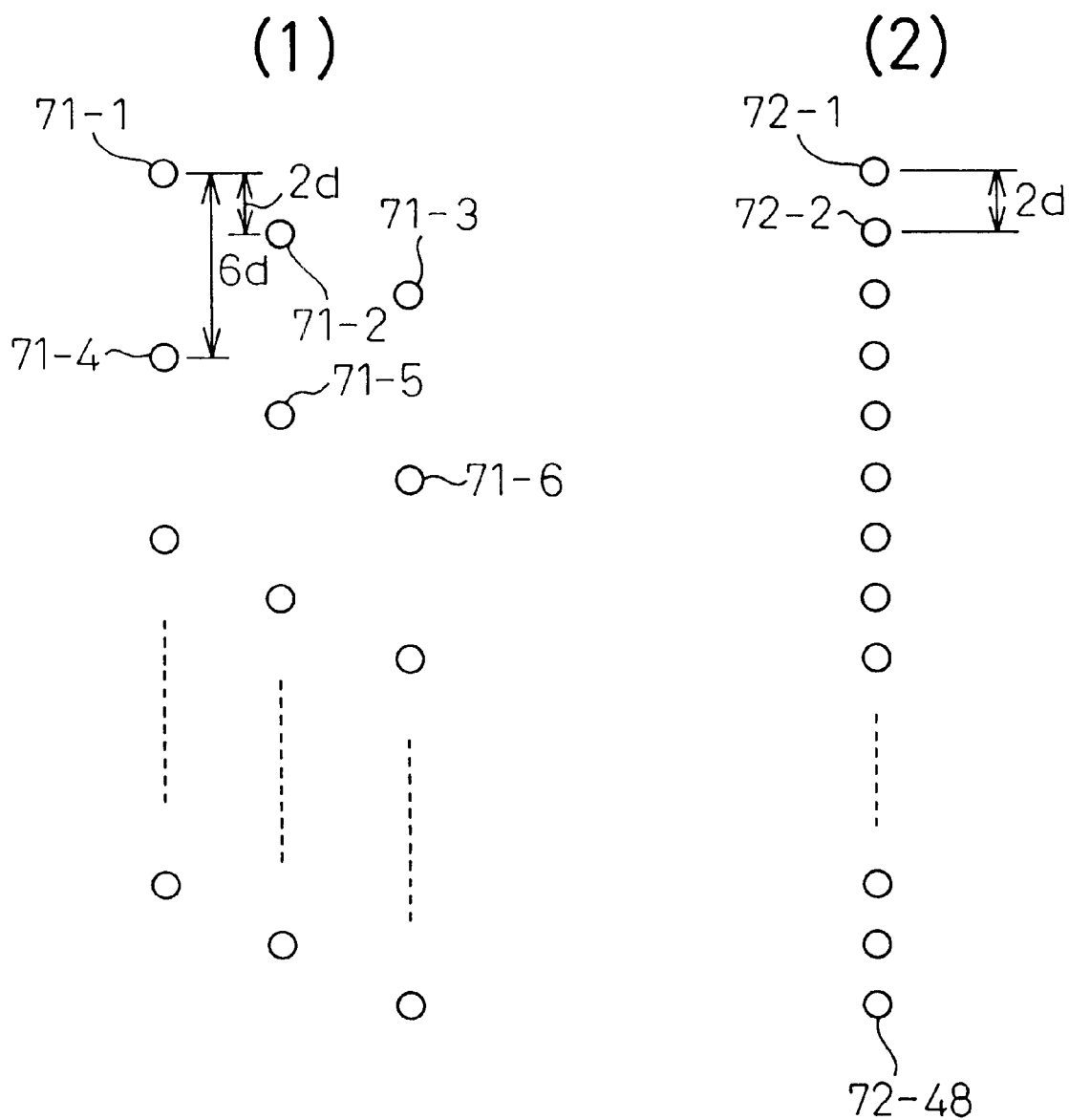
FIGS. 16 (1) and (2) are diagrams that show the nozzle arrangement in the third embodiment of the present invention.

FIG. 16 is a diagram that shows the arrangement of nozzles on the head of the ink-jet printer in the third embodiment of the present invention. As shown schematically, a first group in which 16 nozzles 71-1, 71-4, . . . , 71-46 arranged in a column at a six-dot pitch (6d), a second group in which 16 nozzles 71-2, 71-5, . . . , 71-47 are arranged in a column at a 6d pitch, and a third group in which 16 nozzles 71-3, 71-6, . . . , 71-48 are arranged in a column at a 6d pitch are provided. The second group deviates from the first group in the main scanning direction by a fixed amount and deviates in the vertical scanning direction by 2d. Similarly, the third group deviates from the second group in the main scanning direction by a fixed amount and deviates in the vertical scanning direction by 2d. By shifting the timings to drive each group during the main scanning according to the deviation in the main scanning direction, printing equivalent to that using 48 nozzles 72-1 to 72-48 arranged at a 2d pitch can be realized as shown in FIG. 16 (2). On the head in the third embodiment shown in FIG. 16, six adjacent nozzles, for example, nozzles 72-1 to 72-6 have the same ink spraying angle.

Figure 17:
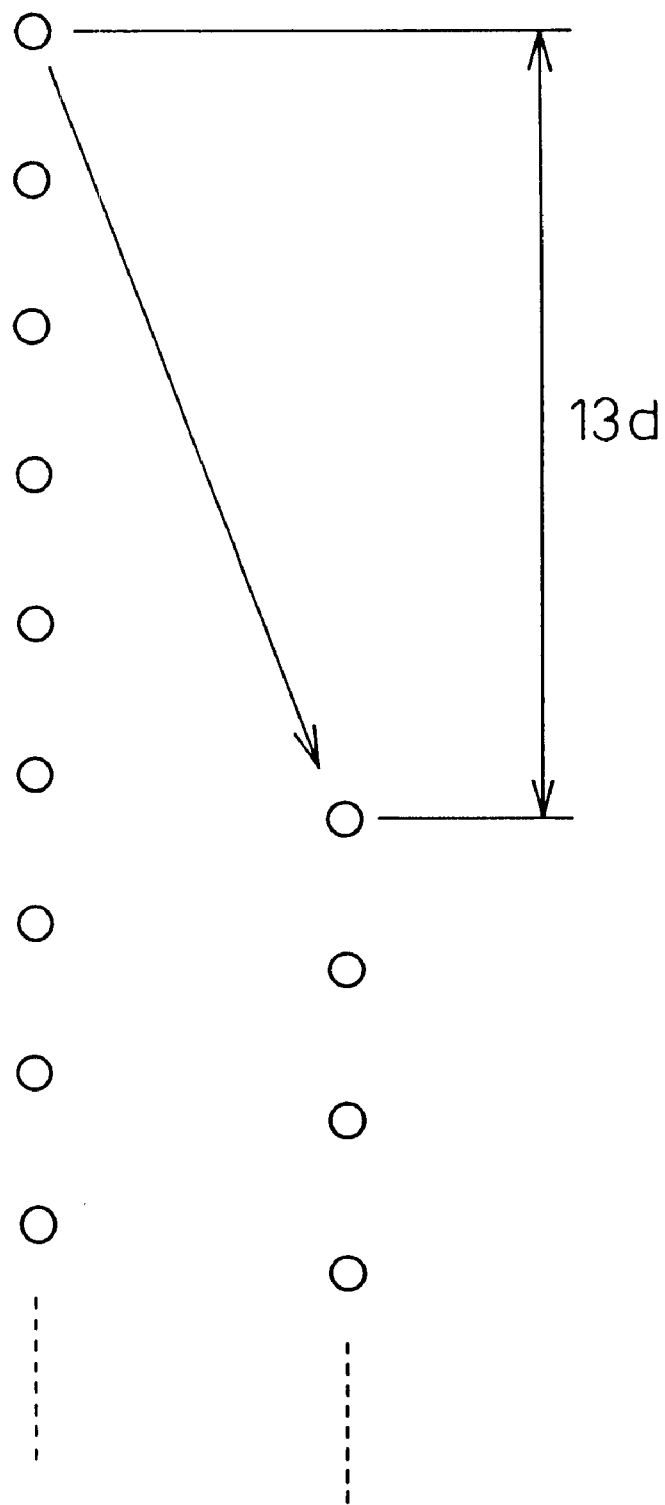
FIG. 17 is a diagram that shows the relative movement between the head and the medium in the vertical scanning direction in the third embodiment.

FIG. 17 is a diagram that shows the relative movement of the medium with respect to the head in the vertical scanning direction in the multi-pass recording mode in the third embodiment. As shown schematically, the amount of movement by the small line feed is 13d.

Figure 18:
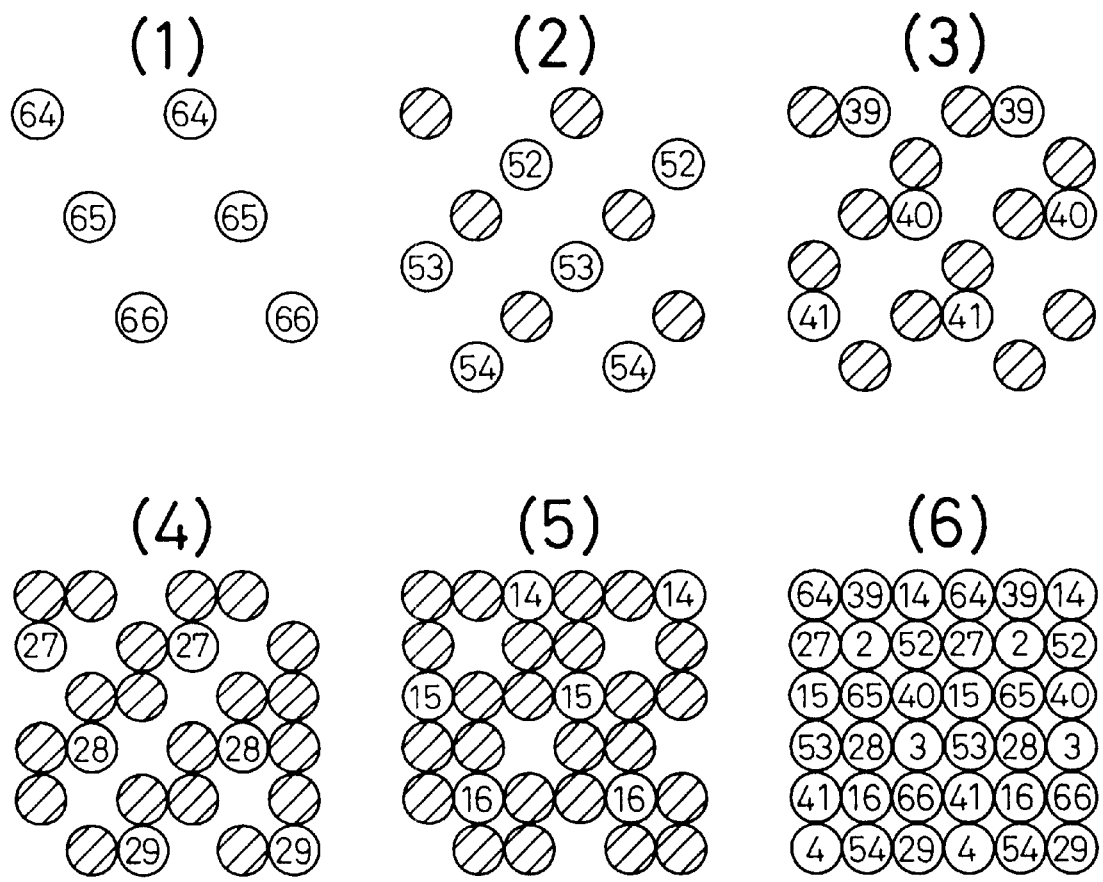
FIGS. 18 (1) to (6) are diagrams that show the order in which dots are printed when printing a belt-shaped vertical line in the third embodiment.

FIG. 18 is a diagram that shows the order in which each dot is printed when a belt-shaped vertical line is printed in the multi-pass recording mode in the third embodiment. As shown schematically, adjacent nozzles are controlled so as not to drive at the same time. In the third embodiment, all dots in the specified range are printed by six-time main scanning.

Figure 19:
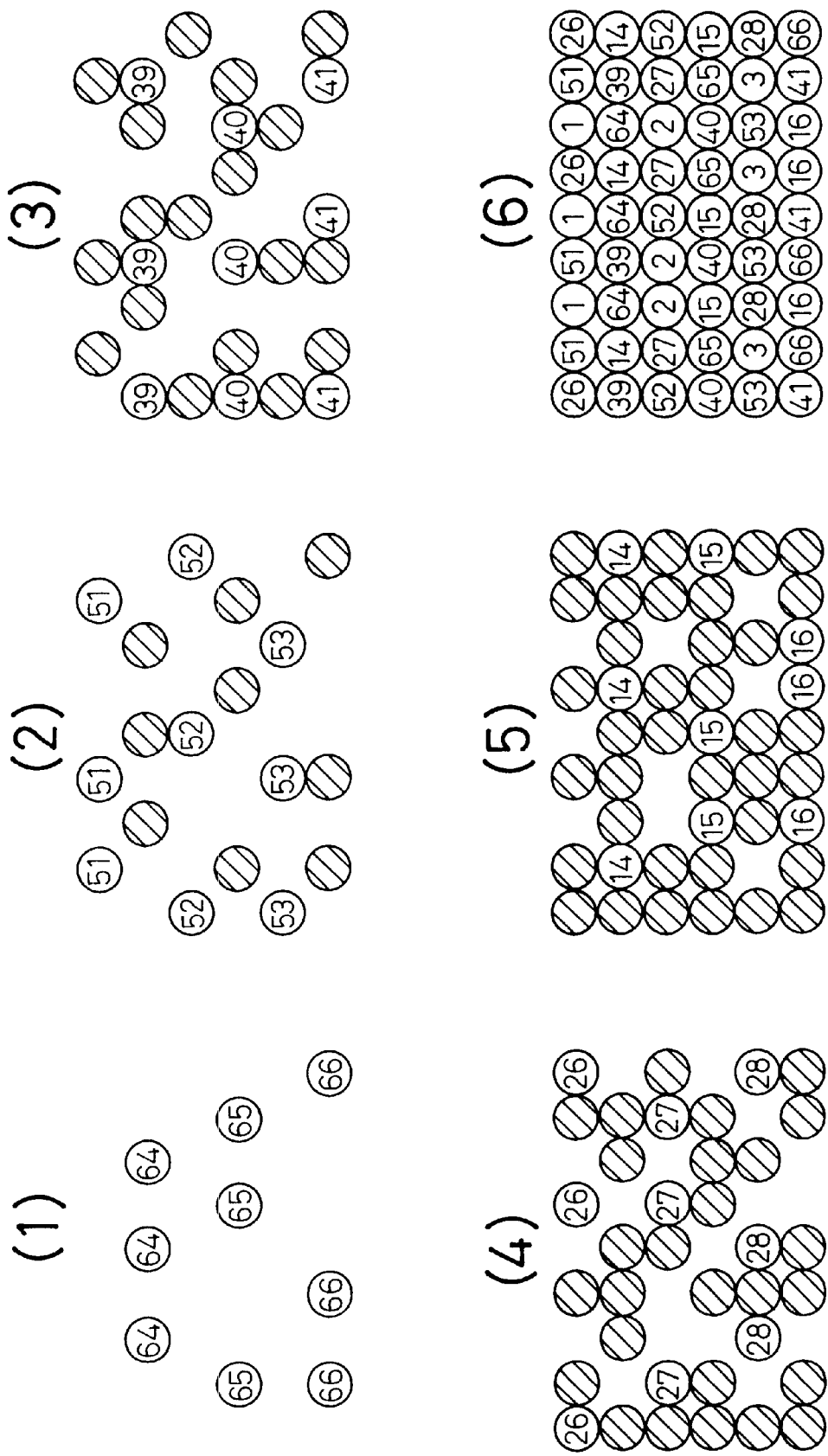
FIGS. 19 (1) to (6) are diagrams that show an example of modification of the order in which dots are printed when printing a belt-shaped vertical line in the third embodiment.

FIG. 19 is a diagram that shows the order in which each dot is printed when a belt-shaped vertical line is printed in the example of modification of the third embodiment. In the multi-pass recording mode, the specified range of each dot row in the main scanning direction is printed by C-time main scanning, but in this example of a modification, the position of dots to be printed by each time printing among C-time printing is determined randomly. First the width to be printed in the main scanning direction is divided into plural ranges appropriately. First random numbers are generated by a random number generator and the first dots to be printed by the first main scanning are determined with the probability 1/C(C=3, here) in each range. Similarly, the dots printed by the first main scanning are excluded from the range, second random numbers are generated, and the dots to be printed by the second main scanning are determined with the probability 1/(C−1) in this range. In this manner, the dots to be printed are determined similarly so that all the dots in this range are printed by the C-time main scanning.

In the example of modification of the third embodiment, the unevenness in density of horizontal lines and the jitters in vertical lines due to the variations in the directions of ink spraying from the nozzle are made less conspicuous compared to an ink-jet printer employing the conventional technique that performs the small line feed and the large line feed, because they appear at an unrecognizable short period and are randomly scattered.

Possibility of the Industrial Use

The present invention can improve the image quality printed by an ink-jet printer that performs a small line feed and a large line feed because the occurrence of the unevenness in the image due to the variations in the spraying angles of nozzles is suppressed and the jitters are made inconspicuous.

We claim:

1. An ink-jet printer, comprising a head that can move in a main scanning direction perpendicular to a vertical scanning direction, on which B (B is an integer) ink spraying nozzles that spray the same ink are arranged at substantially fixed nozzle intervals in the vertical scanning direction and a vertical scanning mechanism that relatively moves a recording medium in the vertical scanning direction with respect to the ink head, wherein the nozzle interval is an A (A is an integer) times the dot pitch (d) and the printing action is carried out by repeating a single printing scan in the main scanning direction, a small line feed printing that repeats an action (C×A−1) times (C is an integer), in which, after a small line feed that relatively moves the recording medium in the vertical scanning direction with respect to the ink head by the amount of n (n is an integer) times the nozzle interval plus one dot pitch ((A×n+1)×d) is performed, a single printing scan in the main scanning direction is performed, and a subsequent large line feed printing that performs a large line feed by the amount of (B×A−(A×n+1)(C×A−1))×d.

2. An ink-jet printer as set forth in claim 1, wherein a single-pass recording mode in which C is 1 and dots that can be printed by a single scan in a main scanning direction are printed by a single printing scan and a multi-pass recording mode in which C is 2 or larger and dots that can be printed by a single-time scanning in a main scanning direction are printed by a C-time printing scan are comprised.

3. An ink-jet printer as set forth in claim 1, wherein the ink spraying nozzles that are adjacent to each other are controlled so as not to drive at the same time in the multi-pass recording mode.

4. An ink-jet printer as set forth in claim 1, wherein when plural dots are printed continuously in the main scanning direction in the multi-pass recording mode, the dot positions to be printed by each printing of the C times printings are randomly determined.

5. An ink-jet printer as set forth in claim 1, wherein m successive nozzles of the ink spraying nozzles have the same ink spraying characteristics and n is a whole number multiple of the m.

* * * * *